Figure 1:
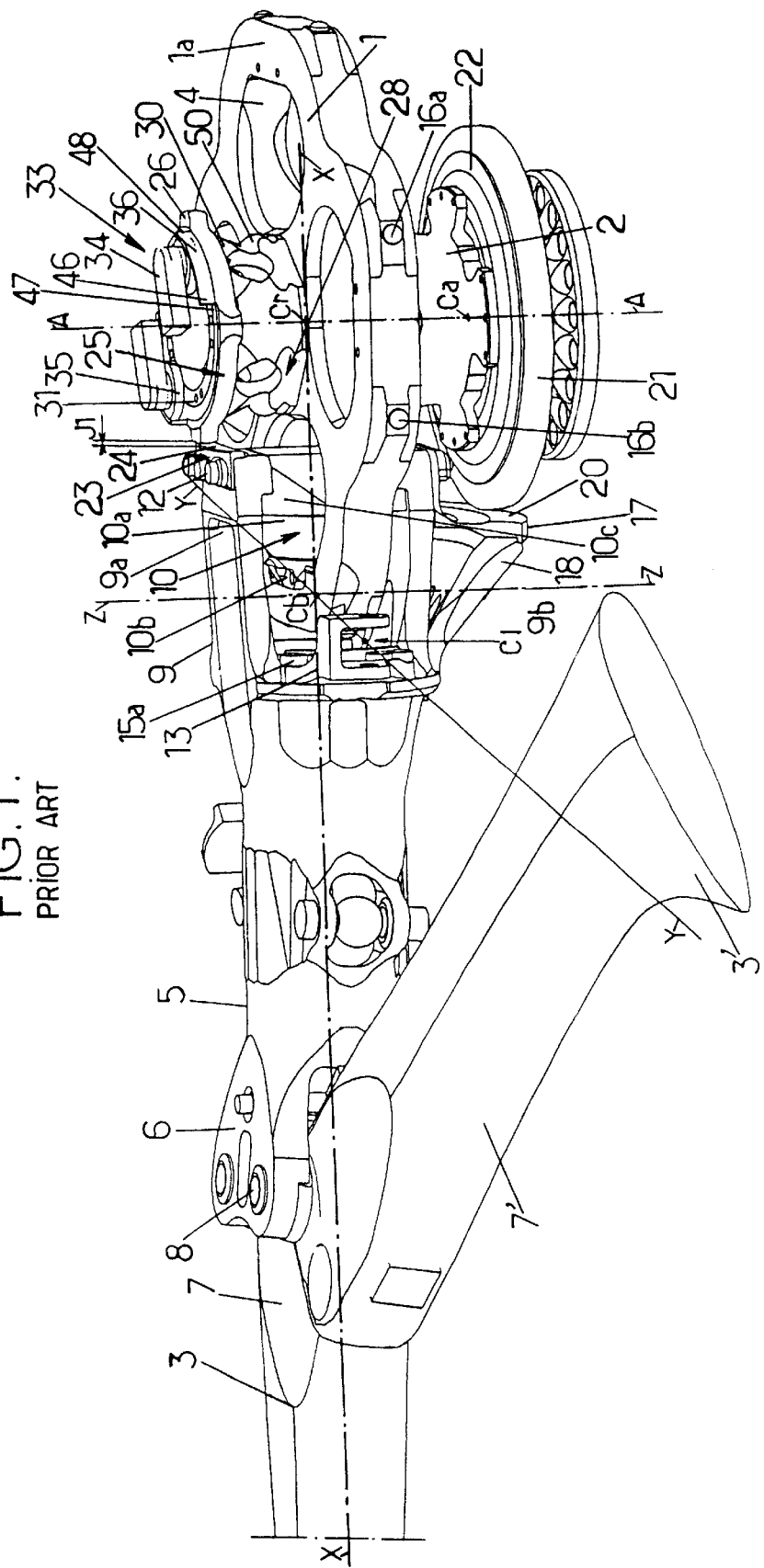

United States Patent [19]
Mondet et al.

[11] Patent Number: 5,820,341
[45] Date of Patent: Oct. 13, 1998

[54] DEVICE WITH RETRACTABLE DOUBLE ANTI-CONE STOPS RING, AND ROTOR HEAD INCLUDING IT

[75] Inventors: Jean Joseph Henri Mondet, Pelissanne; Sylvie Jacqueline Garcin, Carry le Rouet, both of France

[73] Assignee: Eurocopter France, Marignane Cedex, France

[21] Appl. No.: 758,790

[22] Filed: Dec. 3, 1996

[30] Foreign Application Priority Data

Dec. 21, 1995 [FR] France ................................ 95 15272

[51] Int. Cl.$^6$ .................................................. B24C 27/51

[52] U.S. Cl. ............................... 416/46; 416/51; 416/53; 416/140

[58] Field of Search ................................ 416/46, 51, 53, 416/140, 134 A

[56] References Cited

U.S. PATENT DOCUMENTS

| | | |
|---|---|---|
| 2,717,653 | 9/1955 | Emmerson . |
| 5,007,799 | 4/1991 | Mouille . |
| 5,588,801 | 12/1996 | Commelin et al. ........................ 416/46 |

FOREIGN PATENT DOCUMENTS 2 028 749  3/1980  United Kingdom .

*Primary Examiner*—John T. Kwon
*Attorney, Agent, or Firm*—Larson & Taylor

[57] ABSTRACT

The device includes anti-cone stops projecting outward from at least two coaxial rings that can rotate about the rotor axis on the top face of the hub. Flyweights are each mechanically joined to one of the rings by a mechanism for driving the latter in rotation from the "ground" position, in which each anti-cone stop is facing an upper bearing shoe of the corresponding blade, to the "flight" position, in which the anti-cone stops are retracted against elastic mechanisms returning them to the "ground" position.

17 Claims, 6 Drawing Sheets

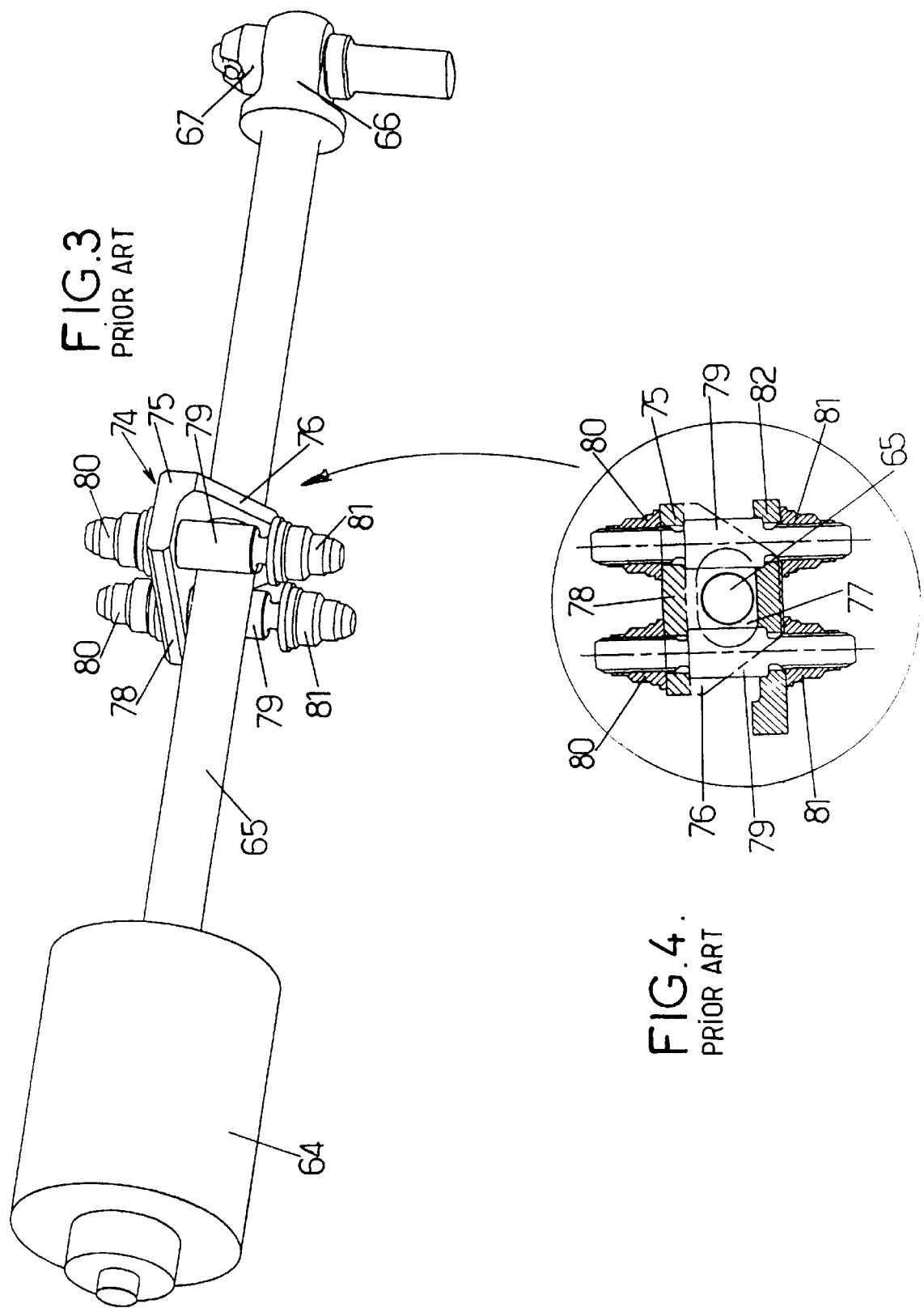

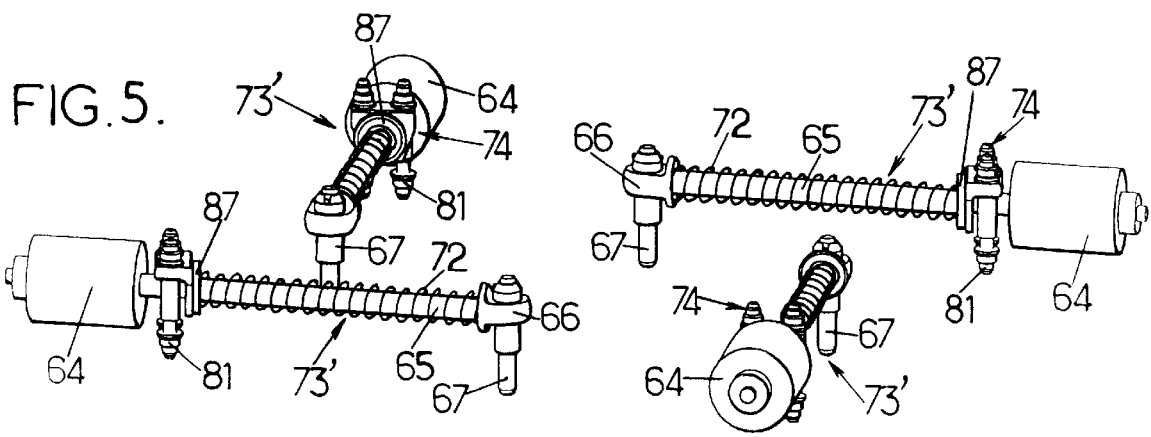
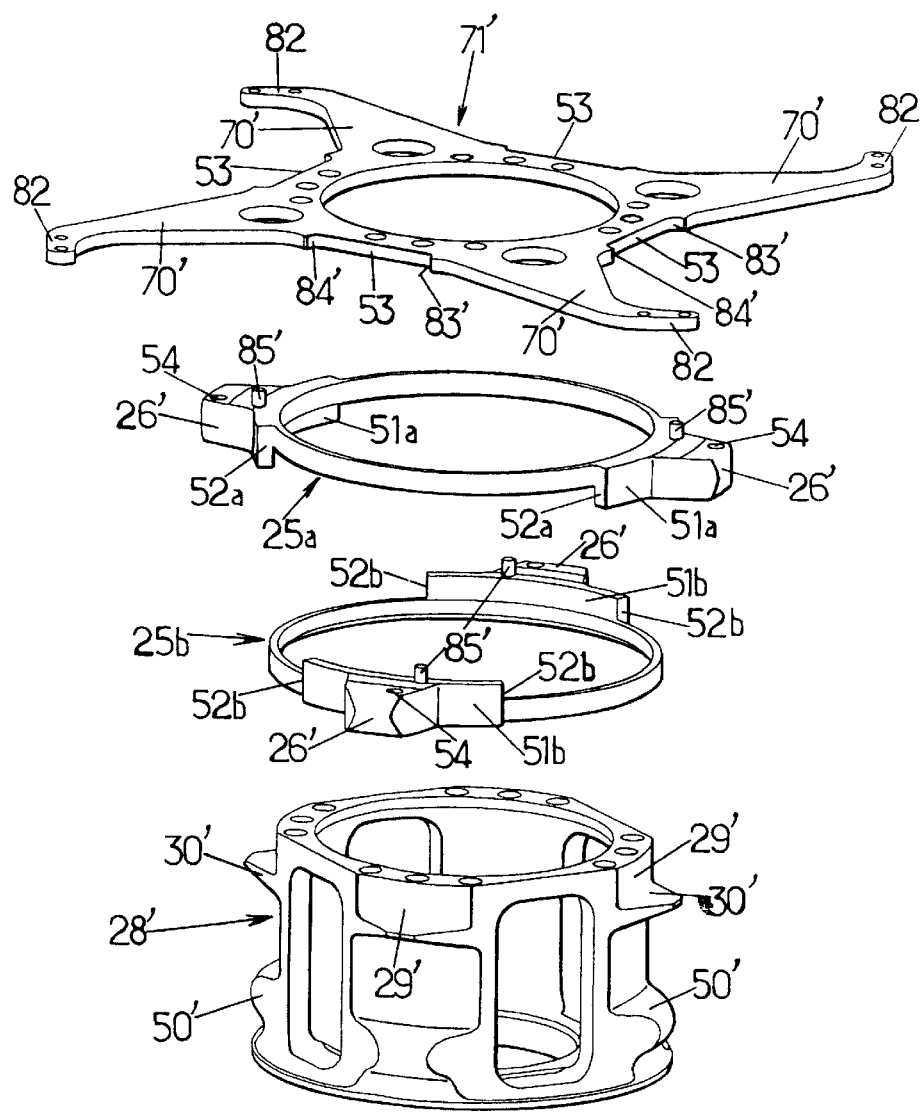
FIG. 5.

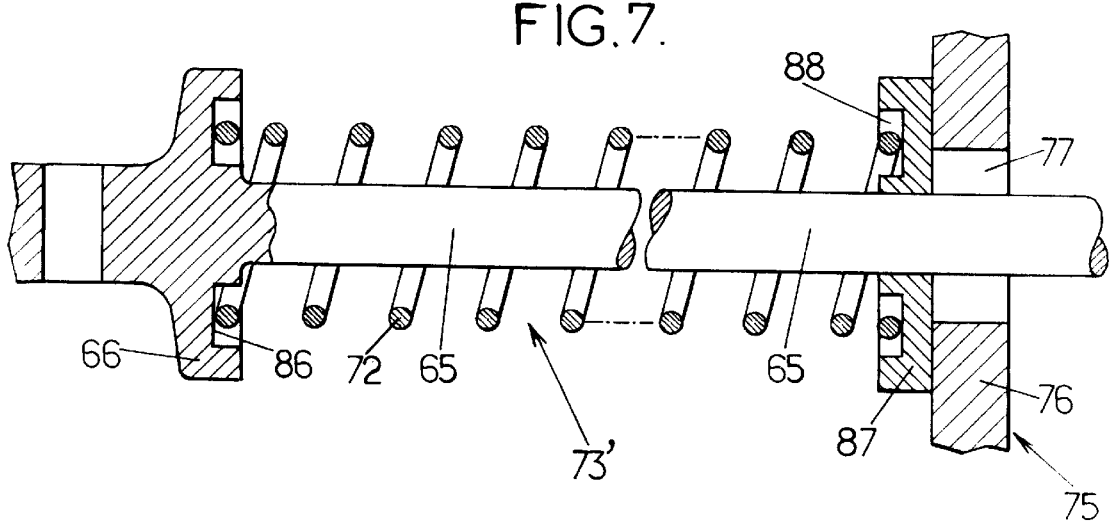
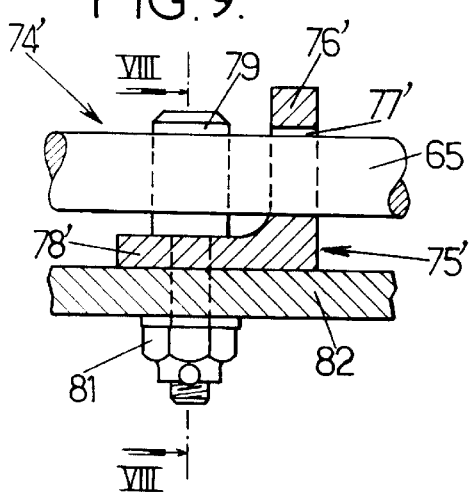
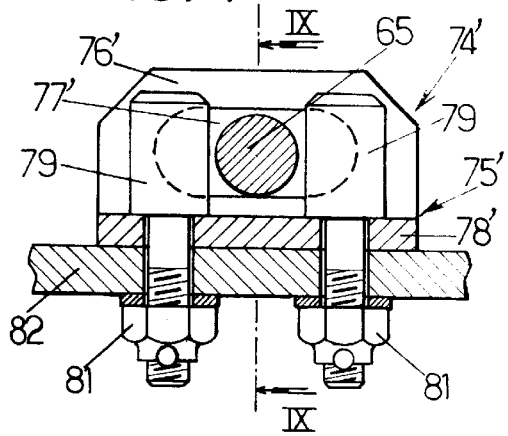
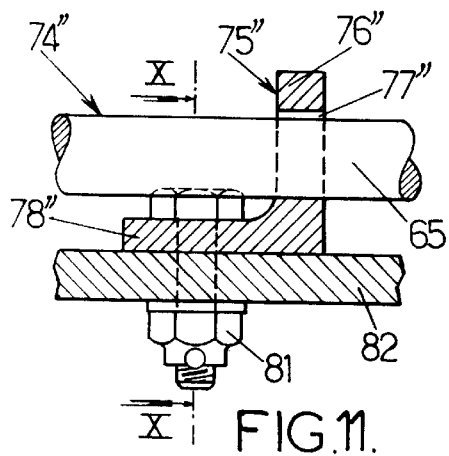
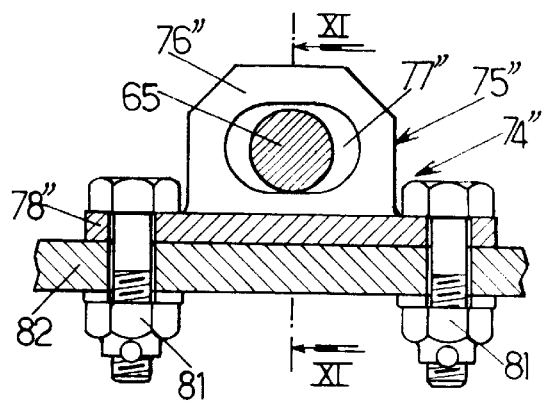

DEVICE WITH RETRACTABLE DOUBLE ANTI-CONE STOPS RING, AND ROTOR HEAD INCLUDING IT

The invention relates to an anti-cone stops device, the stops of which can be retracted in flight, for a rotorcraft rotor, especially for a main rotor of the hinged type or even a hinged tail rotor for a helicopter, and in particular for a helicopter of high tonnage, in which each main rotor is equipped with blades of high mass and large dimensions.

The invention relates more specifically to improvements to the flap stops device of this type which forms the subject-matter of U.S. patent application Ser. No. 08/539,692 filed on Oct. 5, 1995 now U.S. Pat. No. 5,588,801.

Like the flap stops device forming the subject-matter of the aforementioned application, the device according to the invention is more specifically, although not exclusively, intended to equip heavy helicopters, in which the blades of each main rotor have to be able to be folded up, especially automatically using actuators and/or employed in operating conditions causing them to encounter strong and gusting winds, and/or loaded on board surface ships, on the decks of which the blades of the main rotors have to be maneuvered in terms of folding up and in terms of deployment, automatically or manually, while the ships are in motion.

There is proposed in U.S. Ser. No. 08/539,692 a flap stops device which, while retaining the conventional properties of anti-cone stops which can be retracted in flight (that is to say limiting, on the ground, the upward flapping of the flapping masses which may result from gusts of wind or alternatively from impacts during the handling of the helicopter and, in flight, freeing the flapping masses so as to allow, in terms of flap, the whole flight range of the blades) gives, in the "ground" position, a minimum play in terms of flapping, as well as good rigidity in contact, with or without impact, for withstanding the considerable forces of the flapping masses on the hub, and while avoiding any inadvertent retraction.

At the same time the device proposed in the aforementioned application is insensitive to the vertical inertial force of the flyweights which it includes, and to stick maneuvers during manual folding of the blades, in the "ground" position, and in the "flight" position, ensures rapid retraction, good dynamic balance, and complete safety in the event of one or more springs of the elastic return means it has breaking, as well as insensitivity to icing-up, the flap stops device furthermore being of a small size, low mass, and having just a few components.

Finally, the device with retractable anti-cone stops proposed in the aforementioned application advantageously cooperates with a droop restrainer stop with droop restrainer ring in order simultaneously to form hybrid flap and drag stops.

The flap stops device of the type proposed in U.S. Ser. No. 08/539,692, for a rotorcraft rotor, in which each blade is attached to the hub of the rotor by an attachment part joined to the hub by holding and articulating means, includes for each blade, an anti-cone stop projecting outward from a ring substantially coaxial with the hub and mounted so it can rotate about the axis of the rotor on an upper part of the hub, and returned by elastic means to the "ground" position, in which anti-cone stop is directly facing and a small clearance away from a stop track of an upper bearing shoe mounted on the attachment part of the corresponding blade so as to limit the upward flapping of the blade by means of contact of the stop track against the anti-cone stop at rotational speeds of the rotor which are zero and below a threshold corresponding to a speed which is sufficient to allow the rotor to be controlled using the flight controls of the rotorcraft, at least one flyweight being mounted so that it can pivot with respect to the hub about a pin substantially parallel to the axis of the rotor and joined to the ring by means for mechanically driving the ring in rotation about the axis of the rotor so that at rotational speeds of the rotor which are greater than the threshold, the flyweight is moved away from the axis of the rotor under the effect of centrifugal force acting upon it, and the anti-cone stops of said ring are retracted against elastic return means into a "flight" position such that the anti-cone stops no longer face the corresponding upper bearing shoes of the blades which are no longer limited in terms of upward flapping by the anti-cone stops, said elastic return means tending to return the ring to the "ground" position of the anti-cone stops that the ring carries and said flyweight toward the axis of the rotor.

The device described in U.S. Ser. No. 08/539,692 comprises a single rotary ring, having all the anti-cone stops, and to which all the flyweights are joined.

This device displays a drawback, namely a risk of locking up when the clearance for flapping between the anti-cone stops of the ring and the stop tracks of the upper bearing shoes of the blades is a small clearance and when, on start-up, the rotor finds itself highly stressed in terms of cyclic flapping. Cyclic flapping corresponds to a flapping movement of the blade about the axis of flapping of the means of articulating the blade to the hub, this movement varying according to a sinusoidal law during one revolution of the rotor. Cyclic flapping is encountered mainly under three circumstances: when the rotor is started up while the cyclic pitch controls are in a position other than the neutral position, the blade then has an angle of incidence which, as soon as the rotor first starts to rotate, causes cyclic flapping; similarly, the blade may have an angle of incidence in the presence of wind, this wind blowing in a direction which does not induce the same incidence on each blade, and therefore does not induce the same flapping; finally, in the case of a helicopter on the deck of a ship, the movements of the ship when the rotor is started up may introduce cyclic flapping.

Cyclic flapping presents no danger when the flap stops device, as is conventional, allows a relatively large flapping clearance, of the order of ±2°. When the rotor first starts to rotate on start-up, the cyclic flapping fluctuates between +/−1°, so that the stop tracks of the blades do not touch the anti-cone stops of the rotor ring of the device described in U.S. Ser. No. 08/539,692, and the anti-cone stops can easily be retracted by rotating the ring driven by the flyweights subjected to the action of centrifugal force. Bearing in mind the increase in rotational speed of the rotor up to nominal speed, each blade can then freely carry out flapping movements, giving the rotor its natural cone shape.

When the flapping clearance is reduced to a small value (+/−1°), as advantageously permitted by the device described in U.S. Ser. No. 08/539,692, so as to allow the blades to be folded back automatically when the rotor is stopped, or so as to reduce the movements of the blades under the effect of the wind or of movements of the ship, the stop track of an upper bearing shoe of a blade may then, when the rotor first starts to rotate, and in the presence of cyclic flapping, come into contact with an anti-cone stop of the ring and temporarily prevent the ring from turning.

However, bearing in mind the number of blades of the rotor, and the fact that the cyclic flapping, as mentioned hereinabove, follows a sinusoidal law, there may still be contact between an anti-cone stop of the ring and the flap stop track of one of the flapping masses (each consisting mainly of a blade and of its piece for joining to the hub), which prevents the anti-cone stops from being retracted.

The object of the invention is to overcome this drawback of the risk of locking up in the presence of cyclic flapping when the flapping clearance is small, in a flap stops device according to U.S. Ser. No. 08/539,692, while retaining the numerous advantages afforded by this device and as mentioned in the aforementioned application, the description of which is incorporated into the present descriptive text by reference, and to which reference may be made for further details on this subject.

To this end, the anti-cone stops device according to the invention, of the type proposed in U.S. Ser. No. 08/539,692, and as explained hereinabove, is one wherein the anti-cone stops are distributed on at least two rings substantially coaxial with the hub and able to rotate about the axis of the rotor and held in axial positions offset from one another along said axis of the rotor, and each of said rings is, independently of the other ring, on the one hand, connected to at least one flyweight by means for mechanically driving said ring in rotation and, on the other hand, acted upon by elastic return means.

By duplicating the single retractable ring of U.S. Ser. No. 08/539,692, that is to say by using at least two rotary rings carrying anti-cone stops instead of one common ring as in U.S. Ser. No. 08/539,692, the time during which the stop tracks of the upper bearing shoes of the blades are not in contact with the anti-cone stops of either one of the rings may be increased, which favors the rotation of one of the rings upon rotor start-up in order to retract the anti-cone stops. This is because if the rotation of one ring is blocked, upon rotor start-up, by contact of an upper bearing shoe of one blade which has a sinusoidal cyclic flapping of maximum amplitude, against an anti-cone stop of this ring, then the other ring or rings can be driven in rotation by the corresponding flyweights because the amplitudes of the cyclic flapping of the blades facing the anti-cone stops of this or these other rings are not maximum. Then, with the rotor continuing to rotate, the amplitude of the sinusoidal cyclic flapping of the blade locking up a ring reduces, and this ring in turn may be driven in rotation in order to retract its anti-cone stops.

However, by way of an additional precaution to guarantee the rotational drive of a ring locked up by the cyclic flapping of a blade, each of the rings advantageously includes at least one stop for driving another ring in rotation after said ring has been rotated from its "ground" position and above a rotation threshold defined by construction.

In a device with two rings, one of the rings advantageously drives the other in rotation by the cooperation of said stops for driving said rings in rotation.

In order to limit the axial bulk of the device, it is advantageous, at least on one ring, but preferably on each of them, that at least one stop for driving the other ring in rotation, but preferably each of said driving stops, is a radial face of said ring which projects axially toward said other ring.

According to an advantageously simple embodiment, said radial face of a ring forming a stop for driving the other ring in rotation, and preferably each of said radial faces, is a radial end face of a ring portion supporting an anti-cone stop of said ring. If, in addition, for a rotor having an even number of blades, the anti-cone stops consist of protrusions, equal in number to the blades, and projecting alternately, in the circumferential direction about the axis of the rotor, from each of said two rings, and preferably integral with *the corresponding ring, then two rings which are imbricated in one another via their portions displaying the anti-cone stops and the faces for driving the rings are obtained, and this improves the ability of one ring to drive the other in rotation as it moves by the interaction of the rings by contact of the radial end faces of said ring portions.

In addition, anti-cone stops are thus produced which have great rigidity and great strength, have a simple and economic structure, include a limited number of parts, not many more than the number of parts in the device of U.S. Ser. No. 08/539,692 and, like the latter device, have a limited bulk freeing a large amount of space above the hub, this space being available for other systems, for example sighting systems or deicing systems.

In order to respect the dynamic balance of the rotor, each ring of the device is connected to at least two flyweights which are specific to it so that said ring, said flyweights, said means by which said ring is driven mechanically in rotation by said flyweights and said means for elastic return of said ring and of said flyweights, are symmetric with respect to the axis of the rotor.

In order to ensure the correct arrangement of the anti-cone stops in the "ground" and "flight" positions, each rotary ring and means for holding or supporting the rings on the hub advantageously each display, on the one hand, respectively a first stop of at least one pair of first rotation stops interacting in the circumferential direction to halt the rotation of said ring in the "ground" position under the action of the corresponding elastic return means and, on the other hand, respectively a second stop of at least one pair of second rotation stops interacting in the circumferential direction to halt the rotation of said ring in the "flight" position under the action of centrifugal force acting on each flyweight joined to said ring.

The elastic return means may in the conventional way act directly on the flyweights, but, like in U.S. Ser. No. 08/539,692, they preferably comprise, for each ring, at least one helical spring joining a fixed point of said ring to a point, which is fixed with respect to the hub, of said means for holding said rings on the hub.

In order for the device advantageously to be in the form of a subassembly which can be premounted and preset before being installed on the hub, except as regards the upper bearing shoes of the blades, the means for holding or supporting the rings on the hub comprise a support of cylindrical overall shape, attached to the upper face of the hub, and said rings are held around a rotation bearing surface formed in the upper part of the support between a removable plate fixed to the support and at least one radial shoulder thereof, and the support may display, between each shoulder and a part for linking to the hub, at least one boss projecting outward and forming a flight anti-cone stop or upper flap stop for each blade.

The mechanical drive means joining each flyweight to a rotary ring may be produced according to the various alternative forms described in U.S. Ser. No. 08/539,692: these mechanical drive means may comprise a pinion secured to the flyweight and mounted so that it can pivot about a pivot linked to the means for holding the rings on the hub, the pinion meshing with toothing of one of the rings, so that pivoting of a flyweight and of the corresponding pinion under the predominant effect of centrifugal force or of the elastic return means are simultaneous with the rotations of this ring from the "ground" position toward the "flight" position or in the opposite direction, respectively, as described with reference to FIGS. 1 to 4 of U.S. Ser. No. 08/539,692. According to the alternative form of FIGS. 5 and 6 of the aforementioned patent application, the mechanical drive means may comprise a lever with two arms articulated together via one of their ends, and of which a first arm, supporting the flyweight at its opposite end, is mounted so that it can pivot between its ends on a fixed point of the means for holding the rings on the hub, while the second arm is articulated by its opposite end at a fixed point of a ring so that a movement of the second arm and a rotation of the corresponding ring on its means for holding on the hub from the "ground" position toward the "flight" position, or in the opposite direction, corresponds to any pivoting of the first arm moving the flyweight respectively away from or toward the axis of the rotor. According to other alternative forms, toggle joints or cable connections may be substituted, for each flyweight, for the lever with two articulated arms.

However, according to an embodiment, which is also proposed in U.S. Ser. No. 08/539,692 and which is advantageous from the point of view of simplicity and reliability of the means, these mechanical drive means joining each flyweight to the corresponding rotary ring comprise a rod carrying said flyweight at one end, and mounted so that it can pivot via its opposite end on a fixed point of said ring and so that it can slide between its ends in means forming a gliding and pivoting link at a fixed point of said means for holding the rings on the hub, so that any movement under the effect of centrifugal force or of said elastic return means leads, by pulling on said sliding and pivoting rod, to a rotation of said ring from the "ground" position toward the "flight" position or in the opposite direction, respectively.

The gliding and pivoting link means may comprise, as described with reference to FIGS. 7 and 8 of U.S. Ser. No. 08/539,692, a ball joint through which the rod passes in a sliding manner, and which is held in pivoting fashion in a ball joint socket of said means for holding or supporting the rings on the hub. However, in a more crude and more reliable embodiment, with no risk of jamming regardless of the weather conditions, and which in particular is insensitive to icing-up and to sandstorms, the gliding and pivoting link, in a similar manner to the one described with reference to FIGS. 9 to 12 of U.S. Ser. No. 08/539,692, is provided by an angle bracket, one leg of which displays an oblong slot through which said rod passes, with clearance along the major and minor axes of the slot. This rod may in addition, pass between two mutually parallel cylinders parallel to the minor axis of the slot and held, on the other leg of the angle bracket and on a lug for fastening said means for holding the rings on the hub. Advantageously also, said fixing lug is substantially flat and parallel to the other leg of the angle bracket which is fixed in such a way that said rod also passes with clearance between said other leg of the angle bracket and said fixing lug.

In this embodiment, the elastic return means may comprise, for each flyweight, a helical compression spring surrounding said rod between its end pivoting on one of the rings and said gliding and pivoting link means, so as to bear, on the one hand, on said ring and, on the other hand, on said means for holding it on the hub, and, when said holding means comprise the aforementioned support and the aforementioned holding plate, said gliding and pivoting link means may, for each flyweight, be carried at the outer radial end of one of at least four arms respectively of said plate for holding the rings on said support, and the pivoting end of said rod is fitted with a socket end fitting mounted so that it can pivot on a pivot pin fixed to an anti-cone stop of one of said rings, at least one anti-cone stop of each ring carrying an axially projecting peg simultaneously forming a first rotation stop and a second rotation stop for said ring, and of which the circumferentially-directed movements with said ring are limited by two radial end faces of a notch formed in the periphery of said holding plate, said radial end faces forming respectively a first rotation stop and a second rotation stop for said holding means for halting the rotation of said ring in the "ground" position and "flight" position.

In addition, and like the device proposed in U.S. Ser. No. 08/539,692, in order to operate simultaneously as a "ground" drag stops device when the flap stops device of the invention is mounted on a hinged rotor in which the means for holding and articulating each blade on the hub comprise an articulation or laminated spherical stop, the flap stops device of the invention advantageously additionally includes a droop restrainer stops mechanism including, for all the blades, a common lower stop of the droop restrainer ring type mounted so that it can move radially about a shaft of the rotor, beneath the hub rotationally secured to the shaft and, for each blade, a lower bearing shoe secured to the part for attaching the blade to the hub and displaying a stop track by means of which the lower bearing shoe comes into contact with the droop restrainer ring at zero and low rotational speeds of the rotor.

For equipping the main rotors of heavy helicopters, another subject-matter of the invention is a rotor head, of the type comprising a rotor hub secured in terms of rotation to a rotor mast about an axis of rotation of the rotor, and to which each of the blades of the rotor is joined by an attachment part which is forked and has two branches, and by means for holding and articulating on the hub which comprise an outer radial armature fixed to the hub, and an inner radial armature fixed to the inner radial ends of the two branches of the corresponding forked attachment part, which rotor head comprises a stops device according to the invention and as set out hereinabove, and, for each blade, holding and articulating means including a laminated spherical stop incorporated between the two corresponding armatures and housed between the two branches of the corresponding forked attachment part, so that its center of rotation is substantially situated on the same side as the outer radial armature, said forked attachment part of each blade being a substantially radial linking member such as a cuff, shaped at its inner radial end into a clevis, the two branches of which are fixed to the inner radial armature of the corresponding holding and articulating means, and the outer radial end of which includes means for fixing to the root of the corresponding blade and for pivoting said blade with respect to said linking member in order to allow the blade to be folded back. Advantageously, the pivoting of the blade with respect to the linking member is ensured by a folding fitting, mounted so that it can pivot at the outer radial end of the linking member, and in which the root of the corresponding blade is held, the pivoting of the fitting and of the blade being controlled by an actuator housed in a part arranged as a cuff of the linking member.

Figure 2:
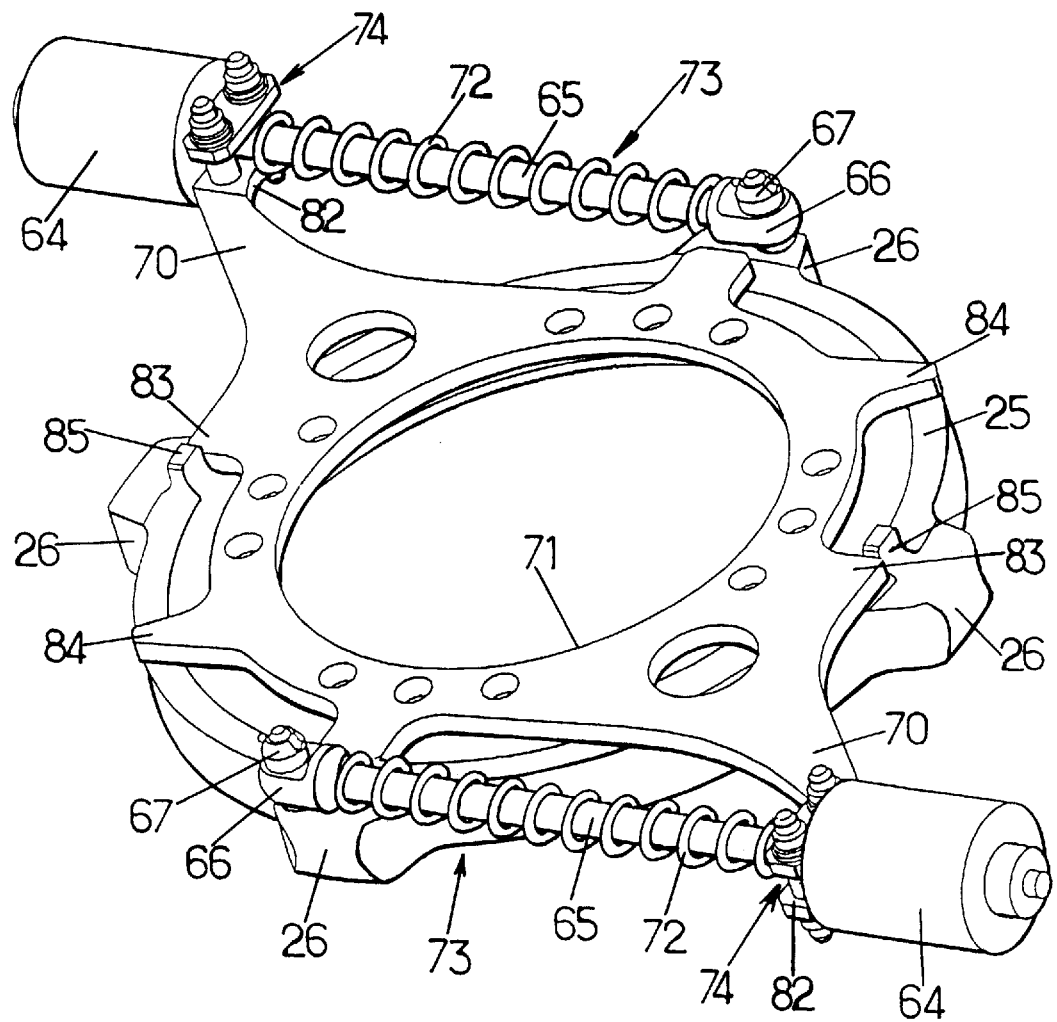
Figure 6:
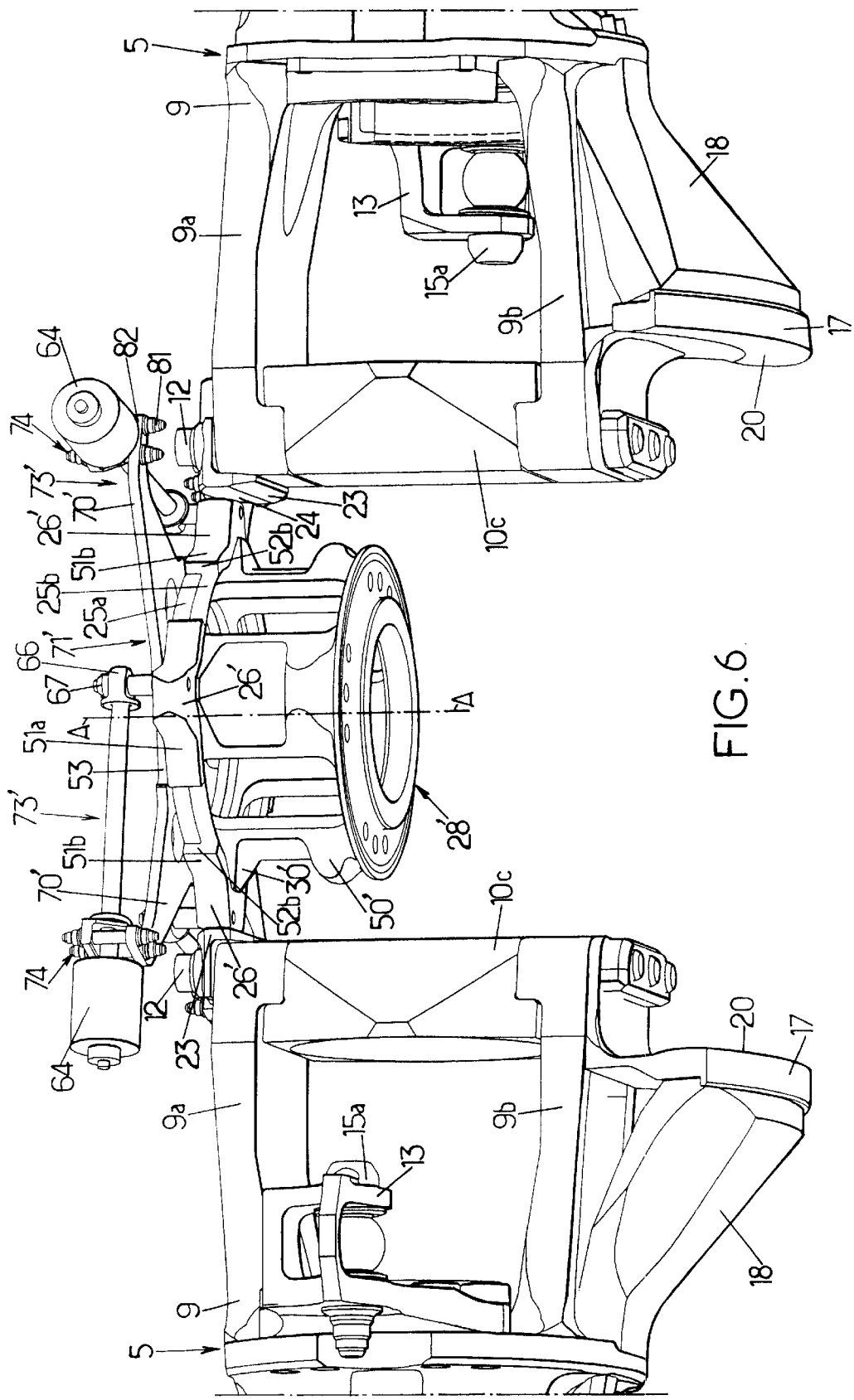

Further features and advantages of the invention will emerge from the description given hereinbelow, without implied limitation, of an embodiment described with reference to the appended drawings in which:

FIG. 1 is a perspective view of the head of a four-bladed rotor with just one blade for the sake of the clarity of the representation and one anti-cone and droop restrainer stops device in the "ground" position, in accordance with the state of the art according to U.S. Ser. No. 08/539,692, FIG. 2 is a diagrammatic perspective view of the anti-cone stops device according to the alternative form of FIGS. 9 to 12 of U.S. Ser. No. 08/539,692 in the "ground" position, FIG. 3 is a perspective view of the retraction mechanism, without return spring, of the anti-cone stops device of FIG. 2, FIG. 4 is a view in transverse section of FIG. 3, FIG. 5 is an exploded perspective view of the components of the subassembly fixed to the hub of the rotor in an anti-cone stops device according to the invention, which is an improvement on the alternative form of FIG. 2, FIG. 6 is a perspective view of the device of FIG. 5 in the "ground" position assembled on the central part of a rotor head according to FIG. 1 and represented partially, without hub or rotor mast, FIG. 7 is a diagrammatic partial view in longitudinal section of a retraction mechanism of the device of FIG. 5, FIG. 8 is a view similar to FIG. 4 and in transverse section on VIII—VIII of FIG. 9, for an alternative form of gliding and pivoting link of the retraction mechanism, FIG. 9 is a partial view in section on IX—IX of FIG. 8, and FIGS. 10 and 11 are sections similar respectively to FIGS. 8 and 9 for a second alternative form of gliding and pivoting link.

FIG. 1 corresponds to FIG. 1 of U.S. Ser. No. 08/539,692 and represents an example of an anti-cone stops device described with reference to FIG. 1 of the aforementioned patent application.

The rotor, the head of which is represented in FIG. 1, of the so-called "hinged" type, comprises a hub 1 secured in terms of rotation to a rotor mast 2 driven in rotation about the axis A—A of the rotor. For each of the blades 3 of the rotor (four blades 3 in this example, opposed in pairs), the hub 1, substantially in the form of a plate having as many swellings 1a projecting radially outward as the rotor has blades 3, displays an axial recess 4 made, in part, in the corresponding swelling 1a of the hub 1. Housed in each recess 4 are means for holding and articulating the corresponding blade 3 on the hub 1, via an attachment cuff 5. This cuff 5 has its outer radial end (with respect to the rotor axis A—A) formed as a clevis 6 for linking to the root 7 of the corresponding blade 3, with the aid of two mutually parallel pins such as 8 which are parallel to the rotor axis A—A and pass through bores facing each other in the two, upper and lower, parallel branches of the clevis 6 and in the blade root 7, one of the pins 8 being removable to allow the blade 3 to be folded by pivoting about the other pin 8, as represented as 3' and 7' for the blade and its root in FIG. 1. The inner radial end part of the cuff 5 is also formed as a clevis 9 for linking to the means 10 for holding and articulating the blade 3 on the hub 1, these means 10 consisting of an articulation or laminated spherical stop of well known structure.

The laminated spherical stop 10 comprises a central part 10a consisting of an alternating stack of rigid dished elements and of leaves of an elastic elastomer in the form of spherical caps, the leaves of elastomer and the rigid dished elements being secured to one another by vulcanization, and this central part 10a is bonded via its concave outer radial face against the convex inner radial face of an outer radial armature 10b shaped as a yoke straddling the outer radial edge of the corresponding recess 4 and fixed by bolts (not represented) to the edge of the corresponding swelling 1a of the hub 1. The central part 10a of the laminated spherical stop 10 is also bonded via its convex inner radial face into a concave recess of corresponding shape of an inner radial armature 10c mounted in the manner of a spacer piece between the upper branch 9a and lower branch 9b of the inner radial clevis 9 of the cuff 5, and to which branches the inner armature 10c is fixed by three bolts such as 12, parallel to the rotor axis A—A and extending in a plane perpendicular to the longitudinal pitch-change axis X—X of the corresponding blade 3, which axis X—X passes through the center Cr of the rotor, on the rotor axis A—A, and through the center Cb of the laminated spherical articulation 10, this center Cb being situated in the part 1a of the hub 1 on which the outer armature 10b bears.

For each blade 3, the center Cb of the corresponding laminated spherical articulation 10 is the meeting point of the pitch axis X—X, drag axis Z—Z, parallel to the rotor axis A—A, and flap axis Y—Y passing also through the center Cl of a ball joint articulation (not represented) at the end of the pitch lever 13 bolted onto the cuff 5, on the leading edge side of the corresponding blade 3, and between the branches 9a and 9b of the inner clevis 9. The pitch lever 13 also carries one 15a of two flight drag stops of which the other (not represented) is fixed directly to the cuff 5 so that these two stops are on either side of the pitch axis X—X and in a plane perpendicular to Z—Z and come to bear against respectively one of two flight drag stops such as 16a and 16b fixed so that they project radially outward from the edge of the swelling 1a of the hub 1 so as to limit, in flight, the angular excursions of the blade 3 in drag forward or backward with respect to the direction of rotation of the rotor.

The rotor is equipped with droop restrainer stops comprising, for each blade 3, a lower bearing spur 17 fixed below the lower branch 9b of the inner clevis 9 of the corresponding cuff 5 by the bolts 12 which fix the two branches 9a and 9b of this clevis on the inner armature 10c of the laminated spherical articulation 10, and this lower bearing shoe 17, substantially in the shape of an angle bracket, is stiffened by a brace 18 bolted to the lower end of the shoe 17 and to the lower branch 9b. Toward the mast 2, the shoe 17 displays a droop restrainer stop track 20 which is flat and perpendicular to the pitch axis X—X, via which track it comes to bear against the periphery of a droop restrainer ring 21 when the rotor is stationary or turning slowly. The droop restrainer ring 21 surrounds the rotor mast 2, beneath the hub 1, and is mounted so that it can move freely in a radial plane inside an annular support 22 of U-section, open radially toward the outside and fixed to the mast 2.

With the rotor stationary, the four flapping masses, each of which consists of a blade 3, of the corresponding cuff 5 with its pitch lever 13 as well as the other components carried by the blade 3 and the cuff 5, rest via the droop restrainer stop tracks 20 against the droop restrainer ring 21, free in a radial plane and ensuring balance of the assembly as it is subjected to the four contact forces which are opposed in pairs. There is therefore balance between the static moments of the flapping masses and the reaction moments of contact of the droop restrainer stop tracks 20 on the droop restrainer ring 21.

In order to limit the upward flapping of each blade 3, the sleeve 5 is also equipped with an upper bearing shoe 23 fixed to the upper face of the inner radial end of the upper branch 9a by the bolts 12 for fixing to the inner armature 10c of the articulation 10, and this shoe 23 also displays an upper stop track 24 which is flat and perpendicular to the pitch axis X—X.

To cooperate with the anti-cone stop tracks 24, the hub 1 is equipped with an anti-cone stop ring 25. This ring 25, solid and very rigid, is integral with protrusions 26 projecting radially outward from the ring 25, equal in number to the blades 3 and distributed in the circumferential direction around the perimeter of the ring 25 so that in a "ground" position (speed of rotation below a threshold), each protrusion 26 forming an anti-cone stop is directly facing and a small clearance J1 away from the anti-cone stop track 24 of a blade 3. This ring 25 is centered on the rotor axis A—A about which it is mounted so that it can rotate on a bearing surface formed in the upper part of a support 28 of cylindrical overall shape bolted to the upper face of the central part of the hub 1. The ring 25 is held facing the bearing surface of the support 28 and prevented from translating axially on the one hand by shoulders 30 of the support 28 and on the other hand by a plate 31 fixed to the top of the support 28 by the bolts which simultaneously fix the support 28 to the hub 1 and possibly fix to the plate 31 a cupola support (not represented) for providing an aerodynamic and protective fairing for the upper part of the rotor head.

In order to allow the flapping of the blades 3 which is necessary for the coning of the rotor in flight, the ring 25 is driven in rotation about the rotor axis A—A so as to retract the anti-cone stops 26 or move them out of the way so that the anti-cone stop tracks 24 each move between two anti-cone stops 26. This rotation of the ring 25 is controlled by two retraction mechanisms 33 which are perfectly symmetric with respect to the rotor axis A—A to ensure balance in rotation. Each retraction mechanism 33 comprises a flyweight 34, a pinion 35 and toothing 36 at the upper part on the periphery of the ring 25. The flyweight 34 is mounted so that it overhangs on the pinion 36, limited to a circular sector, and the teeth of which mesh with those of the straight-cut toothing 36 turned toward the center of the ring 25. The pinion 35, together with its flyweight 34 is mounted so that it can pivot about an axis parallel to the rotor axis A—A on the support 28 and the plate 31 in any known manner, for example as represented in FIG. 3 of U.S. Ser. No. 08/539,692 with the aid of a shouldered bushing clamped onto the plate 31 by a bolted pivot pin, the pinion 35 being centered via its hub with clearance around the shouldered bushing and prevented from axial translation, also with clearance, by a washer between the shouldered bushing and the head of the bolted pivot pin, the friction region between this pivot pin, the shouldered bushing and the hub of the pinion 35 being protected by a cap inserted into the hub of the pinion 35.

Each retraction mechanism 33 also comprises a return spring (not represented in FIG. 1) linked by one end to the ring 25 and by its other end to the plate 31 and which returns the ring 25 in rotation to the ground position represented in FIG. 1 in which position, to position each anti-cone stop 26 of the ring 25 with the small clearance J1 facing each anti-cone stop track 24, this return spring presses the rotation stop 46, formed by one end of the corresponding toothing 36 of the ring 25 against a stop 47 projecting radially from the plate 31. In this ground position, the pinions 35 and flyweights 34 of the two retraction mechanisms 33 are turned so that the two flyweights 34 are close to the axis A—A of the rotor and parallel to each other, on either side of this axis. When the rotational speed of the rotor exceeds a threshold corresponding to sufficient speed to allow the rotor to be controlled effectively using the flight controls, the flyweights 34, subjected to the action of centrifugal force, drive the pinions 35 in rotation on the plate 31 and the support 28 against the return springs which are stretched and loaded, causing, by cooperation of the pinions 35 with the toothings 36 of the ring 25, the rotation of this ring 25 until the rotation stop 48 at the other end of each toothing 36 of the ring 25 comes into contact with a rotation stop projecting radially from the plate 31, this stop not being represented in FIG. 1, but being similar to the stop 47. In this flight position, the anti-cone stops 26 of the ring 25 are retracted with respect to the anti-cone stop tracks 24, which allows the blades 3 to flap about their axis of flap Y—Y through the flight envelope. The stiffness of the return springs is adapted, especially with respect to the flyweights 34, so as to obtain the beginning and the end of retraction travel as a function of desired values of the rotational speed of the rotor.

As represented in FIG. 2 of U.S. Ser. No. 08/539,692, the return spring may be a helical spring attached by one end to a peg projecting above an anti-cone stop 26 of the ring 25 and, by the other end attached to a peg projecting above a perforated radial arm secured to the plate 31 and projecting outward from this plate 31.

The support 28 also has, in the region of each recess 4 of the hub 1 and between its shoulders 30 and its lower part by means of which it bears on the hub 1, a boss 50 projecting outward from the support 28 and which forms a flight anti-cone stop secured to the hub 1 and interacting with the anti-cone stop track 24 of a blade 3 to limit the upward flapping thereof to a maximum angle of approximately 20°, for example.

The known alternative form of anti-cone stops device represented without support 28 in FIG. 2 is distinguishable from the example of FIG. 1 merely in the structure of the holding plate 71 and of the retraction mechanism 73 which is similar, respectively, to the plate 31 and to the mechanisms 33 of FIG. 1, so that the identical elements which have been kept are denoted by the same numerical references. In particular, we again find the rotary ring 25 with its protrusions forming anti-cone stops 26.

Each retraction mechanism 73 comprises a flyweight 64 mounted on one end of a rod 65 equipped, at its other end, with a socket end fitting 66 by means of which the rod 65 is mounted so that it can pivot about an axis parallel to the rotor axis A—A on a pivot 67 projecting from one of the anti-cone stops 26 of the rotary ring 25. Between the flyweight 64 and the pivoting end fitting 66, the rod 65 passes through a gliding and pivoting link 74, the structure of which is specified below, and which is fixed to the outer radial end of one or two radial arms 70 respectively of the plate 71 which like in the previous example, holds, the ring 25 on its support fixed to the hub. Each return spring is a helical compression spring 72 surrounding that part of the rod 65 extending between its end fitting 66 and the link 74, against which end fitting and link it bears via its ends so as to push the sliding and pivoting rod 65 back until the flyweight 64 is brought against the link 74, in the ground position (FIG. 2) for which each anti-cone stop 26 of the ring 25 faces an upper bearing shoe (such as 23 in FIG. 1) of a blade of the rotor.

Under the action of centrifugal force, each flyweight 64 is moved radially outward, exerting a pulling force on the rod 65 which slides axially in the link 74, pivoting with respect to the latter linked to the fixed parts which consist of the arm 70 and the plate 71. The spring 72 is compressed between the link 74 and the end fitting 66, which is moved with the ring 25 in rotation in a direction moving it closer to the link 74, by the pulling of the rod 65, which has the effect of retracting the anti-cone stops 26 of the ring 25 with respect to the upper bearing shoes 23 (FIG. 1). When the rotational speed of the rotor drops, each spring 72 relaxes, pushing the end fitting 66 and the rod 65 in the opposite direction, toward the ground position of FIG. 2.

The structure of the gliding and pivoting link 74, as well as its interaction with the sliding rod 65 are represented in FIGS. 3 and 4.

This link 74 comprises an angle bracket 75, for example one made of steel, a trapezoidal leg 76 of which displays an oblong slot 77 (FIG. 4) of major axis substantially parallel to the other, rectangular, leg 78 of the angle bracket 75. The rod 65 passes through the slot 77 with clearance in the direction of the minor axis of this slot, and with much greater clearance in the direction of the major axis, allowing the relative pivotings of the rod 65 and of the angle bracket 75 when changing between the "ground" and "flight" positions. The rod 65 passes between the two opposite straight flanks (horizontal in FIG. 4) of the slot 77, and also between two identical mutually parallel cylinders 79 parallel to the minor axis of the slot 77 and fixed, by bolting at 80, onto the leg 78 of the angle bracket 75 and at 81 under a flat anchoring lug 82 parallel to the leg 78 and secured to the outer radial end of the arm 70.

A link 74 is thus obtained which allows the axial gliding or sliding of the rod 65 in the slot 77 and between the cylinders 79 and also, with clearance, between the leg 78 and the lug 82, as well as the pivoting of this rod 65 with respect to the angle bracket 75 without having any moving or articulated part in this link 74. The embodiment of FIGS. 2 to 4 is therefore rudimentary, while not running any risk of jamming and being insensitive to weather conditions (icing-up, sandstorms).

In addition, the plate 71 (FIG. 2) also displays, for each of the two retraction mechanisms 73, two radial rotation stops 83 and 84 corresponding respectively to the stop 47 of FIG. 1 for halting the ring 25 in the "ground" position, and to the similar stop of the holding plate for halting the ring 25 in the "flight" position. These two stops 83 and 84 of the plate 71 interact with an axial rotation stop 85 of the rotary ring 25, corresponding to the stops 46 and 48 of FIG. 1, and projecting respectively from one of the two protrusions 26 which has no pivot 67, for halting the ring 25 in the "ground" position (FIG. 2) and "flight" position respectively.

The device of FIG. 2 is fixed by the holding plate 71 on a support such as 28 of FIG. 1 so that, like in the example of FIG. 1, the anti-cone stops 26 of the rotary ring 25 are, in the "ground" position, facing upper bearing shoes 23 fixed to the upper arms 9a of the inner devices of the cuffs 5 for linking the blades to the hub, the structure of the latter not being limited to that of FIG. 1, so that it can take the stops device, because the latter can be mounted on any hinged hub.

In both examples, the clearance J1 between the anti-cone stop tracks such as 24 in FIG. 1 and the anti-cone stops of the hub 1 is obtained by interposing retractable protrusions 26 of the rotary ring 25 in front of these anti-cone stop tracks 24.

As there is no drag and the blades may have any pitch when the rotor is stationary, each flapping mass rests in its natural position on the droop restrainer ring 21 (FIG. 1), being subjected to its static moment, as explained hereinabove. The flat droop retainer stop track 20 is therefore normal to the spherical radius of this droop restrainer ring 21 at the point of contact. If a blade is acted upon in terms of drag, owing to the rotation of the blade about its axis of drag Z—Z (see FIG. 1), the point of contact between the droop restrainer ring 21 and the droop restrainer stop track 20 is displaced and, as the distance between the center Ca of the droop restrainer ring 21 and the center Cb of the laminated spherical articulation 10 cannot change, this displacement of the point of contact leads to an upward tilting of the flapping mass about its axis of flap Y—Y and, as the clearance between the anti-cone stops track 24 and the anti-cone stop 26 of the ring 25 is small, simultaneous locking-up in terms of flap and in terms of drag rapidly ensues. The effect of combined flap and drag stops given by the interaction of the anti-cone stops of the device with droop restrainer stops with a droop restrainer ring is all the more pronounced the smaller the clearance J1. This feature makes it possible to avoid the use of an actuator or specific tooling for blocking these two movements in order to fold the blades.

However, a small clearance J1 leads, in the case of cyclic flapping when the rotor is started up, to the ring 25 becoming locked up by an upper bearing shoe 23 of one blade in contact with the anti-cone stop 26 opposite on the ring 25. Retraction of the anti-cone stops 26 can therefore not take place. After a rotation through 90°, for a four-bladed rotor is described hereinabove, and if none of the conditions changes, the ring 25 is locked up again by contact of an anti-cone stop 26 with the upper bearing shoe 23 of the next blade, and so on blade after blade, resulting in a serious drawback in the operation of the device in the case of an initial clearance J1 which is too low.

This drawback is overcome by virtue of the improved device of FIGS. 5 and 6.

The retractable anti-cone stops device represented in exploded perspective in FIG. 5 comprises an anti-cone stops support 28' and a holding plate 71' which correspond respectively to the support 28 of FIG. 1 and to the plate 71 of FIG. 2, as well as four retraction mechanisms 73' each of which is similar to that 73 of FIGS. 2 to 4 with, however, a few improvements, and finally two rings which can rotate and are coaxial about the axis of the rotor and held axially offset along this axis, namely an upper ring 25a and a lower ring 25b, instead of the single ring 25 of FIGS. 1 and 2, and on each of which two retraction mechanisms 73' specific to this ring 25a or 25b are mounted so that they can pivot symmetrically with respect to the central axis of the device, aligned with the axis of the rotor to afford better effectiveness and good dynamic balance of the device.

To allow the rotation of the rings 25a and 25b on the support 28' which is annular and substantially cylindrical, the latter displays, about its upper part, a rotation bearing surface 29' formed of non-adjacent cylindrical sectors each delimited between one of several radial shoulders 30' of the support 28' and the upper face thereof. Under each shoulder 30' and above its base, the support 28' also displays a flight anti-cone stops boss 50'. After the lower ring 25b has been fitted around the bearing surface 29' and bearing on the shoulders 30', then the upper ring 25a has been fitted around the bearing surface 29' and bearing on the lower ring 25b, the plate 71' is fixed, as in FIG. 1, on the top face of the support 28' by bolts (not represented) which also fix the support 28' via its base to the hub, so that the support 28' and the plate 71' are secured to the hub, and so that the two rings 25a and 25b can turn coaxially about the support 28' on which the rings 25a and 25b are held axially offset and against one another between the shoulders 30' of the support 28' and the holding plate 71' (see FIG. 6).

For a rotor with an even number of blades (four in this example), each of the rings 25a and 25b has a number of anti-cone stops 26' which is half the number of blades, and the anti-cone stops 26' of the device are distributed alternately on each of the rings 25a and 25b, in the circumferential direction. In this example, each ring 25a or 25b thus has two anti-cone stops 26' which are diametrically opposed and offset, in the ground position, by 90° in the circumferential direction with respect to the anti-cone stops 26' of the other ring. On each ring 25a or 25b, each anti-cone stop 26' is a protrusion projecting radially outward from the center of one respectively of two diametrically opposed ring portions 51a or 51b which are themselves thickened and project radially outward with respect to the rest of the corresponding ring 25a or 25b. In addition, each of the two ring portions 51a of the upper ring 25a also projects axially toward the lower ring 25b, while conversely each of the two ring portions 51b of the lower ring 25b also projects axially toward the upper ring 25a. Each of the rings 25a and 25b is of a single piece with its thickened ring portions 51*a* or 51*b* and its anti-cone stops 26'. The two rings 25*a* and 25*b* can thus be superposed, nesting together, each of the two thickened portions 51*a* of the upper ring 25*a* being positioned about the lower ring 25*b* between the two thickened portions 51*b* thereof, and conversely each of the two thickened portions 51*b* of the lower ring 25*b* being positioned around the upper ring 25*a* between the two thickened portions 51*a* of this ring 25*a* (see FIG. 6). Each of the thickened portions 51*a* is delimited, on the upper ring 25*a*, between two radial end faces 52*a*, and each of the two thickened portions 51*b* of the lower ring 25*b* is similarly delimited between two radial end faces 52*b*. It will be understood that if just one of the two rings 25*a* and 25*b* is driven in rotation through more than an angle of rotation defined by construction, then two diametrically opposed radial faces 52*a* of the upper ring 25*a* will come into contact with two diametrically opposed radial faces 52*b* of the lower ring 25*b*, so that the rotation of one of the rings will drive along that of the other.

In order to limit its rotation with respect to the support 28' and to the plate 71', each of the rings 25*a* and 25*b* also comprises two studs 85', each corresponding to one of the axial rotation stops 85 of the ring 25 of FIG. 2. Each stud 85' projects axially on the top face of respectively one of two thickened portions 51*a* or 51*b* of the corresponding ring 25*a* or 25*b*, and in line with one of the two anti-cone stops 26' of this ring, and the rotations of each stud 85' with the ring which carries it are limited by this stud 85' coming into abutment against one or other of the radial end faces 83' and 84' of one respectively of four evenly distributed notches 53 distributed at the periphery of the plate 71'. For each notch 53, the radial end faces 83' and 84' constitute radial rotation stops corresponding to the radial stops 83 and 84 of the plate 71 in FIG. 2, that is to say that the radial end face 83' forms a rotation stop in the "ground" position of the corresponding stud 85', and that the radial end face 84' forms a rotation stop in the "flight" position for this same stud 85'.

Each of the two anti-cone stops 26' of each ring 25*a* or 25*b* is pierced with an axial orifice 54 intended to take the pivot 67 of respectively one of the two retraction mechanisms 73' which are mounted on the corresponding ring 25*a* or 25*b* independently of the other ring. As a consequence, the plate 71' includes four radial arms 70' each ending in an anchoring lug 82 for fixing the sliding and pivoting link 74 of the corresponding retraction mechanism 73', by bolts such as 81 in FIG. 4.

Each mechanism 73' of FIG. 5 comprises not only all the components described hereinabove of the mechanism 73 of FIGS. 2 to 4 but, in addition, means for the bearing and guidance of the spring 72.

These means comprise (see FIGS. 5 and 7), on the one hand, an annular groove 86 formed coaxially around the rod 65 in the radial face of the socket end fitting 66 which constitutes a stop against which one end of the spring 72 can bear.

On the other hand, these means comprise a special washer 87 which is mounted between the other end of the spring 72 and the leg 76 of the angle brackets 75 and which has passing through it in a sliding manner, the rod 65 passing through the oblong slot 77 of the leg 76.

The annular washer 87 has, in its face turned toward the spring 72, an annular groove 88 in which the corresponding end of the spring 72 is centered and bears, which spring presses the washer 87 against that face of the leg 76 of the angle 75 which is turned toward the socket end fitting 66.

The washer 87 with groove 88 and the groove 86 of the end fitting 66 allow the spring 72 to be guided, and this is particularly true in the region of the angle bracket 75, because the action of the spring 72 is never exactly perpendicular to the bearing leg 76 of the angle bracket 75.

Of course the outside diameter of the washer 87 is greater than the minor axis of the oblong slot 77 and, in general, the major axis of the slot 77 is greater than the diameter of the bearing surface for the spring 72.

Each of the two rings 25*a* and 25*b* is acted upon by its two corresponding retraction mechanisms 73' just like the single ring 25 of FIG. 2. The springs 72 of the two mechanisms 73' return the corresponding ring 25*a* or 25*b* to the "ground" position, in which the studs 85' of this ring each butt against the radial face 83' of the corresponding notch 53 of the plate 71' at zero and low rotational speeds of the rotor. When the rotor is turning at sufficient speed, the flyweights 64, acted upon by centrifugal force and belonging to the corresponding two mechanisms 73' cause this ring 25*a* or 25*b* to rotate until its studs 85' come into abutment against the radial faces 84' of the corresponding notches 53, to lock up this ring 25*a* or 25*b* in the "flight" position, in which its anti-cone stops 26' are no longer facing the upper bearing shoes of the corresponding blades.

The device of FIG. 5 is represented assembled in FIG. 6 and interacting in the "ground" position with a rotor head like that of FIG. 1 limited, for the sake of clarity, to two cuffs 5 carrying upper bearing shoes 23 and without representation of the hub especially, the identical elements which have been kept being denoted by the same numerical references.

From the "ground" position (FIG. 6) if one of the rings 25*a* and 25*b* remains locked up as the rotor starts to rotate by the upper bearing shoe 23 of a blade for which cyclic flapping is at a maximum amplitude bearing against one of its two anti-cone stops 26', then the other ring 25*b* or 25*a* can nonetheless be driven in rotation by the flyweights 64 of its two retraction mechanisms 73' and can retract these anti-cone stops 26' so that when a blade associated with this other ring is in turn subjected to cyclic flapping of maximum amplitude, its upper bearing shoe 23 cannot lock up this other ring 25*b* or 25*a*. The first ring 25*a* or 25*b* which was previously locked up can then be unlocked under the action of the flyweights 64 or its two retraction mechanisms 73', because the cyclic flapping acting upon the corresponding blades is no longer at maximum amplitude. However, if this first ring 25*a* or 25*b* remains locked up after the other ring 25*b* or 25*a* has rotated through a certain amount starting from its "ground" position, then this other ring drives the locked-up ring in rotation by interaction of the radial drive stops 52*a* and 52*b* so that all the anti-cone stops 26' are retracted.

In the application to the gliding and pivoting link 74 described hereinabove, the "inverted" mounting of the angle bracket 75 (see FIGS. 3 and 4) is used because it makes it possible to keep the rod 65 very close to the anchoring lug 82, it being possible for these two elements to be separated by a distance as small as approximately 1 mm.

However, if there is no proximity constraint of this order of magnitude in the desired assembly, a more simple gliding and sliding link like those represented in FIGS. 8, 9 and 10, 11 may be adopted.

In the alternative form of FIGS. 8 and 9, the link 74' also comprises the two parallel cylinders 79, fixed by the bolts 81 to the anchoring lug 82 at the end of an arm 70 of the plate 71', and between which the rod 65 passes, which rod passes with clearance through an oblong aperture 77' in the trapezoidal leg 76' of the angle bracket 75'. However, the other leg 78', rectangular in shape, of the angle bracket 75' is pressed against the lug 82, to which it is fixed by the same bolts 81 screwed along the axes of the cylinders 79 which pass through the leg 78'.

In the alternative form of FIGS. 10 and 11, the link 74" simply comprises an angle bracket 75", one leg 78" of which is fixed against the lug 82 by bolts 81, and the other, trapezoidal, leg 76" of which has the oblong aperture 77" through which the rod 65 passes with clearance, as in the links 74 and 74', so as to allow simultaneous gliding and pivoting between the rod 65 and the link 74", 74' or 74 during operation of a retraction mechanism such as 73'.

The device with the two rings according to the invention thus overcomes the drawback of the risk of locking up through cyclic flapping displayed by the device with just one ring of the state of the art, while retaining the advantages of the latter, and especially the following advantages:

while retaining the conventional properties of retractable flap stops it makes it possible, with the rotor stationary, to maintain a minimum clearance in terms of flap, automatic locking-up in terms of drag by associating with a droop restrainer stop having a droop restrainer ring, great rigidity upon contact with or without impact owing to the monobloc design of each rotary ring, for withstanding the considerable forces of the flapping masses on the hub even in the presence of strong wind, this being true more particularly during automatic or manual folding-up or deployment of the blades, so that the device of the invention makes it possible to avoid having an electromechanical device or specific tooling for locking-up the blades in terms of flap and in terms of drag during folding-up, it prevents inadvertent retraction of the anti-cone stops 26' on the ground since, during stick movements, the anti-cone stop tracks such as 24 cannot drive either of the rings 21*a* and 21*b* in rotation in any direction because this ring is prevented from turning on the one hand, by the corresponding rotation stop 83' and, on the other hand, the frictional force of the track 24 on the ring 25*a* or 25*b* is less than the return force of the two corresponding springs 72 added to the frictional forces of the lower ring 25*b* pressed against the support 28' and against the upper ring 25*a*, or of the latter pressed against the lower ring 25*b* and rubbing against the holding plate 71'. Furthermore, in the case of vertical movements, the retractable stops 26' of the rings 25*a* and 25*b* are not sensitive to the inertial force on the retraction flyweights 64, as already stated, it frees up a usable space between the hub and the cuffs 5 of the blades, or between the cuffs 5 themselves, it being possible for this space to be used for the passage of elements of a de-icing device or of actuators required for automatic folding-up of the blades, it respects the balance of the rotor, owing to its perfect symmetry with respect to the rotor axis A—A, it is insensitive to the phenomenon of icing-up since, when the rotor is stationary, any ice deposited is broken by the impacts obtained, upon start-up, as soon as the anti-cone stop tracks 24 strike the anti-cone stops 26' of the rotary rings 25*a* and 25*b* for the first time and, with the rotor turning, if a ring 25*a* or 25*b* remains locked-up in the flight position, safety is not compromised, and in the event of breakage of one return spring 72 in flight, then the other associated with the same rotary ring 25*a* or 25*b* is still available and is dimensioned to return this ring to the "ground" position, during deceleration, and in the event of breakage of both return springs 72 of the same ring 25*a* and 25*b*, since this ring remains retracted during the end of the flight and when coming to a standstill, flight safety is not compromised.

We claim:

1. A flap stops device, for a rotorcraft rotor, in which each blade is attached to a hub of the rotor by an attachment part joined to the hub by holding and articulating means, and including, for each blade, an anti-cone stop projecting outward from a ring substantially coaxial with the hub and mounted so that it can rotate about the axis of the rotor on an upper part of the hub, and returned by elastic means to a ground position, in which each anti-cone stop is directly facing and a small clearance away from a stop track of an upper bearing shoe mounted on the attachment part of the corresponding blade so as to limit the upward flapping of the blade by means of contact of said stop track against said anti-cone stop at rotational speeds of the rotor which are zero and below a threshold, at least one flyweight being mounted so that it can pivot with respect to the hub about a pin substantially parallel to the axis of the rotor and joined to the ring by means for mechanically driving the ring in rotation about the axis so that at rotational speeds of the rotor which are greater than the threshold, said flyweight is moved away from the axis of the rotor under the effect of centrifugal force acting upon it, and the anti-cone stops of said ring are retracted against the elastic return means into a flight position such that they no longer face the corresponding upper bearing shoes of the blades which are no longer limited in terms of upward flapping by said anti-cone stops, said elastic return means tending to return the ring to the "ground" position of the anti-cone stops that the ring carries and said flyweight toward the axis of the rotor, wherein the anti-cone stops are distributed on at least two rings substantially coaxial with the hub and able to rotate about the axis of the rotor and held in axial positions offset from one another along said axis of the rotor, and each of said ring is, independently of the other ring, connected to at least one flyweight by the means for mechanically driving said ring in rotation and acted upon by the elastic return means.

2. The flap stops device as claimed in claim 1, wherein each of the two rings includes at least one stop for driving the other ring in rotation after said ring has been rotated from the ground position.

3. The flap stops device as claimed in claim 2, wherein the rotational driving of each of the two rings by the other is provided by the interaction of said stops for driving said rings in rotation.

4. The flap stops device as claimed in claim 2, wherein, on at least one ring, at least one stop for driving the other ring in rotation is a radial face of said ring which projects axially toward said other ring.

5. The flap stops device as claimed in claim 4, wherein said radial face of a ring forming a stop for driving the other ring in rotation is a radial end face of a ring portion supporting an anti-cone stop of said ring.

6. The flap stops device as claimed in claim 1, wherein each ring is connected to at least two respective flyweights so that said ring, said respective flyweights, said means by which said ring is mechanically driven in rotation by means of said flyweights, and said means for elastic return of said ring and of said flyweights, are symmetric with respect to the axis of the rotor.

7. The flap stops device as claimed in claim 1, wherein the rotor which has an even number of blades, and wherein the anti-cone stops consist of protrusions, equal in number to the blades, which project alternately, in the circumferential direction about the axis of the rotor, from each of said two rings, and which are integral with the corresponding ring.

8. The flap stops device as claimed in claim 1, wherein each rotary ring and means for holding said rings on the hub each display respectively (a) a first stop of at least one pair of first rotation stops interacting in the circumferential direction to halt the rotation of said ring in the ground position under the action of the corresponding elastic return means and, (b) a second stop of at least one pair of second rotation stops interacting in the circumferential direction to halt the rotation of said ring in the flight position under the action of centrifugal force acting on each flyweight joined to said ring.

9. The flap stops device as claimed in claim 8, wherein, for each ring, said elastic return means comprise at least one helical spring joining a fixed point of said ring to a point, which is fixed with respect to the hub, of said means for holding said rings on the hub.

10. The flap stops device as claimed in claim 8, wherein said means for holding the rings on the hub comprise a support of cylindrical overall shape, attached to the upper face of the hub, and said rings are held around a rotation bearing surface formed in the upper part of the support between a removable plate fixed to the support and at least one radial shoulder thereof, and the support, between each shoulder and a part for linking to the hub, displays at least one boss projecting outward and forming a flight anti-cone stop for each blade.

11. The flap stops device as claimed in claim 8, wherein said mechanical drive means joining each flyweight to the corresponding rotary ring comprise a rod carrying said flyweight at one end, and mounted so that the rod can pivot via an opposite end on a fixed point of said ring and so that the rod can slide between ends in means forming a gliding and pivoting link at a fixed point of said means for holding the rings on the hub, so that (a) any movement under the effect of centrifugal force leads, by pulling on said sliding and pivoting rod, to a rotation of said ring from the ground position toward the flight position and (b) any movement under the effect of said elastic return means leads, by pulling on said sliding and pivoting rod, to a rotation of said ring from the flight position toward the ground position.

12. The flap stops device as claimed in claim 11, wherein the elastic return means comprise, for each flyweight, a helical compression spring surrounding said rod between its end pivoting on one of the rings and said gliding and pivoting link means, so as to bear on said ring and on said means for holding it on the hub.

13. The flap stops device as claimed in claim 11, wherein said gliding and pivoting link means comprise an angle bracket fixed to said holding means and one leg of which displays an oblong slot through which said rod passes, with clearance along the major and minor axes of the slot.

14. The flap stops device as claimed in claim 13, wherein said rod passes between two mutually parallel cylinders parallel to the minor axis of the slot and held on the other leg of the angle bracket and on a lug for fastening said means for holding the rings on the hub.

15. The flap stops device as claimed in claim 14, wherein said fixing lug is substantially flat and parallel to the other leg of the angle bracket which is fixed so that said rod also passes with clearance between said other leg of the angle bracket and said fixing lug.

16. The flap stops device as claimed in claim 13, wherein for each flyweight, said gliding and pivoting link means are carried at the outer radial end of one of at least four arms respectively of said plate for holding the rings on said support, and the pivoting end of said rod is fitted with a socket end fitting mounted so that it can pivot on a pivot pin fixed to an anti-cone stop of one of said rings, at least one anti-cone stop of each ring carrying an axially projecting peg simultaneously forming a first rotation stop and a second rotation stop for said ring, and of which the circumferentially directed movements with said ring are limited by two radial end faces of a notch formed in the periphery of said holding plate, said radial end faces forming respectively a first rotation stop and a second rotation stop for said holding means for halting the rotation of said ring in the ground position and flight position.

17. A rotorcraft rotor head, comprising a rotor hub secured in terms of rotation to a rotor mast about an axis of rotation of a rotor, and to which each of blades of the rotor is joined by an attachment part which is forked and has two branches, and by means for holding and articulating on the hub which comprise an outer radial armature fixed to the hub, and an inner radial armature fixed to inner radial ends of the two branches of the corresponding forked attachment part, which rotor head comprises a flap stops device including, for each blade, an anti-cone stop protecting outward from a ring substantially coaxial with the hub and mounted so that the ring can rotate about the axis of the rotor on an upper part of the hub, and returned by elastic means to a ground position, in which each anti-cone stop is directly facing and a small clearance away from a stop track of an upper bearing shoe mounted on the attachment part of the corresponding blade so as to limit the upward flapping of the blade by means of contact of said stop track against said anti-cone stop at rotational speeds of the rotor which are zero and below a threshold, at least one flyweight being mounted so that said flyweight can pivot with respect to the hub about a pin substantially parallel to the axis of the rotor and joined to the ring by means for mechanically driving the ring in rotation about the axis so that at rotational speeds of the rotor which are greater than the threshold, said flyweight is moved away from the axis of the rotor under the effect of centrifugal force acting upon said flyweight, and the anti-cone stops of said ring are retracted against the elastic return means into a flight position such that the anti-cone stops no longer face the corresponding upper bearing shoes of the blades which are no longer limited in terms of upward flapping by said anti-cone stops, said elastic return means tending to return the ring to the ground position of the anti-cone stops that the ring carries and said flyweight toward the axis of the rotor, wherein the anti-cone stops are distributed on at least two rings substantially coaxial with the hub and able to rotate about the axis of the rotor and held in axial positions offset from one another along said axis of the rotor, and each said ring is, independently of the other ring, connected to at least one flyweight by the means for mechanically driving said ring in rotation and acted upon by the elastic return means, and, for each blade, said holding and articulating means including a laminated spherical stop incorporated between the two corresponding armatures and housed between the two branches of the corresponding forked attachment part, so that its center of rotation is substantially situated on the same side as the outer radial armature, said forked attachment part of each blade being a substantially radial linking member, shaped at its inner radial end into a clevis, the two branches of which are fixed to the inner radial armature of the corresponding holding and articulating means, and the outer radial end of which includes means for fixing to the root of the corresponding blade and for pivoting said blade with respect to said linking member in order to allow the blade to be folded back.

* * * * *